March 6, 1928.  
P. F. APFEL  
1,661,551  
APPARATUS FOR DRYING LAUNDRY  
Filed May 25, 1925

INVENTOR  
Philip F. Apfel  
BY  
White Prost Evans  
his ATTORNEYS

Patented Mar. 6, 1928.

1,661,551

UNITED STATES PATENT OFFICE.

PHILIP F. APFEL, OF SEATTLE, WASHINGTON.

APPARATUS FOR DRYING LAUNDRY.

Application filed May 25, 1925. Serial No. 32,632.

My invention embraces an apparatus for drying laundry and the like, and its aim is to effect a more rapid and efficient drying of articles of this character than has heretofore been accomplished.

An object of the invention is to provide an improved method of drying laundry and the like which consists in passing heated air currents upwardly over a container in which the articles to be dried are hung, and into said container downwardly over said articles, so as to pass over the entire surfaces of the same at an even temperature and velocity, and preferably drawing the heated air currents over said articles by suction means located below the same in a manner so as to secure evenly distributed currents.

Another object of the invention is to provide means for carrying out said method in a simple, efficient and reliable manner.

My invention will be better understood from the following description taken in connection with the accompanying drawings and its scope will be pointed out in the appended claims.

Referring to the drawings.

Figure 1:
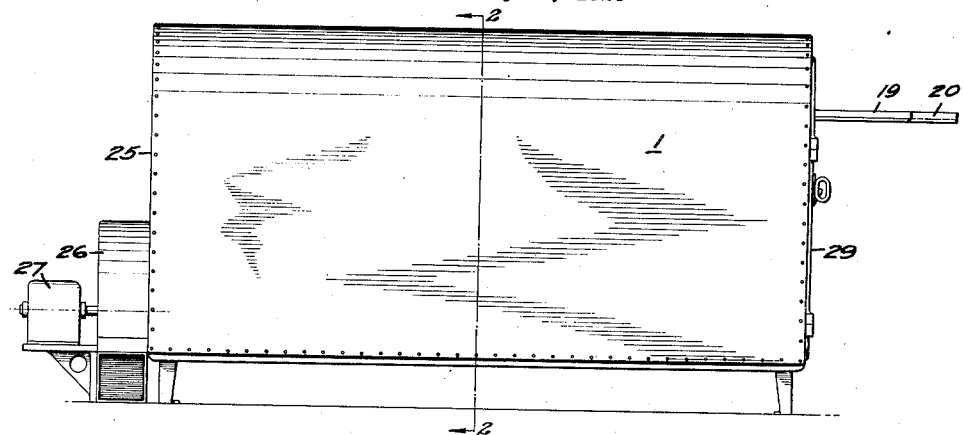
Figure 1 is a side elevation of apparatus embodying my invention.
Figure 2:
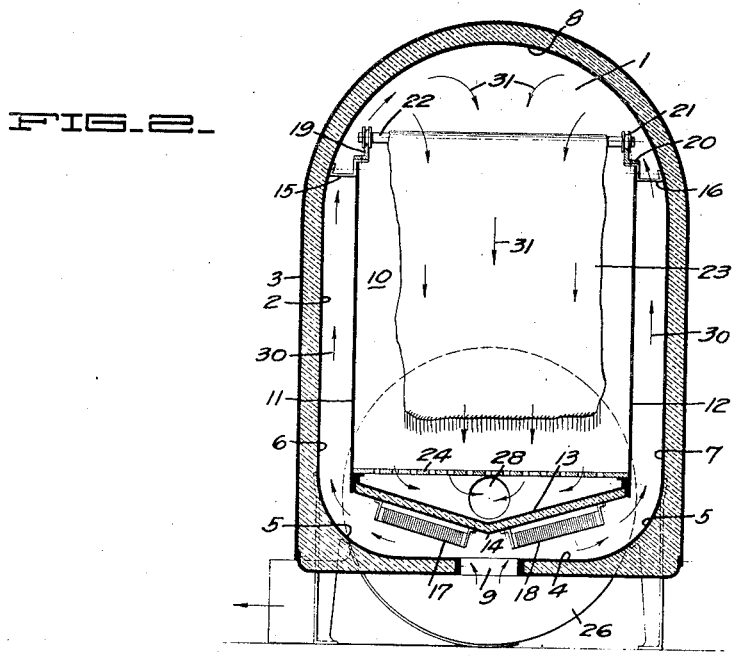
Fig. 2 is a vertical section taken on the line 2—2 of Fig. 1.

The drying apparatus comprises a chamber 1, having suitable heat insulated walls so as to retain heat within the same. As shown, said walls may be formed of two spaced metallic walls 2 and 3 with a filling of suitable heat insulating material therebetween, although any other satisfactory type of heat insulating walls may be used. The interior surface of the floor 4 of said chamber is preferably connected by curved surfaces 5, 5, with the respective side walls 6 and 7, which unite with a curved ceiling 8, as clearly shown in Fig. 2. The floor 4 is provided with a central longitudinal opening 9 preferably extending the length of the chamber 1, which opening connects the interior of the chamber with the atmosphere. Within the chamber 1 is a second chamber 10 having an open top, and formed with side walls 11 and 12 and a floor or bottom 13. The bottom 13 is made of suitable heat insulating material and is preferably formed with an outwardly extending longitudinal ridge 14, positioned centrally with respect to the opening 9 so that currents of air entering the opening 9 are directed toward the surfaces 6 and 7 of the chamber 1. The chamber 10 may be supported within the chamber 1 in any desired manner, so as to leave a passage for the free circulation of air between its outer surfaces and the inner surfaces of the chamber 1. For example, the floor 13 may be secured to the lower edges of the side walls 11 and 12, and the unit so formed may be suspended within the chamber 1 by means of a series of brackets on opposite sides thereof as indicated at 15 and 16. It is obvious that the manner of supporting the chamber 10 within the chamber 1 may assume many forms. A series of suitable electrical heating units, one of each series being shown at 17 and 18 are positioned on opposite sides of the opening or air inlet 9 within the passage between the bottom of the chamber 10 and the floor 4 of chamber 1 whereby air entering through said inlet is evenly heated. These electrical heating units may be conveniently so located by securing the same to the floor 13 as shown in Fig. 2. The top edges of the walls 11 and 12 support the rails 19 and 20 of a track for a carriage 21, which is provided with a plurality of parallel rods 22 for supporting laundry 23 and other articles to be dried, vertically within the chamber 10. Near the bottom 13 and spaced therefrom there is positioned within the chamber 10 a perforated plate 24. One end 25 of the chamber 1 is closed, and at this end a suction fan 26, driven by a motor 27 is connected with an opening 28 to chamber 10 located between said perforated plate 24 and the bottom 13 of said chamber 10 so that the air is drawn through the perforated plate and thereby create evenly distributed currents within the chamber 10. It is of course understood that the suction or draft at the bottom of the chamber 10 may be created in numerous other ways. The opposite end of chamber 1 is provided with a door 29 for closing the chamber. Preferably, the track for carriage 21 extends out from the chamber 1 so that the carriage may be removed from the same for the purpose of hanging articles thereon to be dried, or for removing dried articles therefrom. Having described the apparatus embodying my invention, my improved method for drying articles of the character described will be understood from a description of the operation of said apparatus.

Air enters the chamber 1 through the inlet 9 and is divided into two streams, one passing over the series of electrical heating units 17 and the other over the series of units 18, the same being evenly heated by said units. The heated air passes upwardly over the walls 11 and 12 of the chamber 10, as indicated by the arrows 30, being so directed by the curved surfaces 5, 5 and the chamber 1 is thereby heated to an even temperature. On reaching the upper part of the chamber 1, due to the curvature of ceiling 8, the heated air currents are deflected downwardly into the chamber 10, as indicated by arrows 31, and through the suction action of fan 26, the heated air is drawn over the clothes 23 in evenly distributed currents, this even distribution being assisted by the perforated plate 24 in a manner readily understood. By this arrangement the air within the chamber 1 is evenly heated and it is drawn down over the laundry at an even velocity in evenly distributed currents, which I have found in practice dries the laundry in a more efficient and rapid manner than has heretofore been possible.

I claim:

1. A laundry drying apparatus comprising a heat insulated chamber having an air inlet in the bottom thereof, a second chamber within said first chamber and in communication therewith at the upper portion thereof only, rails adjacent the upper portion of said first chamber, a carriage adapted to suspend articles to be dried mounted on said rails, and means for circulating air thru said chambers in series.

2. A laundry drying apparatus comprising an outer chamber, heat insulating material enclosing said chamber, an inner chamber within and spaced from said outer chamber to form a passage therebetween, an air inlet to said passage at one end of said outer chamber, a plurality of electric coils adjacent said inlet for heating the entering air, an air outlet from said inner chamber adjacent said air inlet, said chambers being in communication only at the end remote from said inlet and said outlet, and means for withdrawing air thru said outlet.

3. A laundry drying apparatus comprising an outer chamber having a barrel vaulted upper portion and a central inlet in the lower portion, an inner chamber supported within said outer chamber to form a passage entirely therearound, said inner chamber being open to said outer chamber adjacent said vaulted portion, an air outlet adjacent the bottom of said inner chamber, means for withdrawing air thru said outlet, and electric coils near said inlet for heating the entering air.

4. A laundry drying apparatus comprising an outer chamber having a barrel vaulted upper portion and an air inlet adjacent the lower portion, heat insulating material surrounding said chamber, a plurality of electric coils for heating air entering said chamber, an inner chamber supported within said outer chamber and spaced from said outer chamber on all sides, said inner chamber and said outer chamber being in communication adjacent said vaulted portion, a carriage for suspending articles to be dried removably supported adjacent said vaulted portion, an outlet adjacent the lower portion of said inner chamber, a perforated plate interposed between said inner chamber and said outlet, and means for withdrawing air thru said outlet.

In testimony whereof, I have hereunto set my hand.

PHILIP F. APFEL.